(12) United States Patent
Schlecht et al.

(10) Patent No.: US 7,434,746 B2
(45) Date of Patent: Oct. 14, 2008

(54) HEATING DEVICE, PARTICULARLY FOR A VEHICLE

(75) Inventors: Patric Schlecht, Ostfildern (DE); Andreas Collmer, Ostfildern (DE); Günter Gerlach, Karlsfeld (DE)

(73) Assignee: J. Eberspächer GmbH & Co. KG, Essingen (DE)

( * ) Notice: Subject to any disclaimer, the term of this patent is extended or adjusted under 35 U.S.C. 154(b) by 327 days.

(21) Appl. No.: 10/519,007

(22) PCT Filed: Jun. 20, 2003

(86) PCT No.: PCT/EP03/06507

§ 371 (c)(1), (2), (4) Date: Jul. 13, 2005

(87) PCT Pub. No.: WO04/000591

PCT Pub. Date: Dec. 31, 2003

(65) Prior Publication Data

US 2005/0260530 A1    Nov. 24, 2005

(30) Foreign Application Priority Data

Jun. 20, 2002 (DE) .............................. 102 27 626

(51) Int. Cl.
*B60H 1/02* (2006.01)
(52) U.S. Cl. .............................. 237/12.3 C; 237/12.3 B; 237/12.3 R; 165/41
(58) Field of Classification Search ............ 237/12.3 C, 237/12.3 B, 185; 165/41, 42
See application file for complete search history.

(56) References Cited

U.S. PATENT DOCUMENTS

| 2,533,508 | A |   | 12/1950 | Riu ............................... 126/101 |
| 3,758,031 | A | * | 9/1973 | Moran ........................... 237/8 A |
| 3,877,639 | A | * | 4/1975 | Wilson et al. ........... 237/12.3 C |
| 4,192,457 | A | * | 3/1980 | Easterly .................. 237/12.3 C |
| 4,662,350 | A | * | 5/1987 | Mossbach .................... 126/101 |
| 4,971,025 | A | * | 11/1990 | Mariani ...................... 126/101 |
| 5,253,806 | A | * | 10/1993 | Gaysert et al. ........... 237/12.3 C |
| 5,273,209 | A |   | 12/1993 | MacArthur |
| 5,340,020 | A | * | 8/1994 | Maus et al. .............. 237/12.3 C |
| 5,722,588 | A | * | 3/1998 | Inoue et al. ............. 237/12.3 C |
| 5,738,506 | A | * | 4/1998 | Mosig et al. .................. 431/90 |
| 6,079,629 | A | * | 6/2000 | Morikawa et al. ........ 237/12.3 C |
| 6,082,625 | A | * | 7/2000 | Faccone et al. .......... 237/12.3 C |
| 6,308,895 | B1 | * | 10/2001 | Atxa et al. .................... 237/2 A |

FOREIGN PATENT DOCUMENTS

| DE | 629 967 | 4/1936 |
| DE | 975 176 | 9/1961 |
| DE | 85 07 953.7 | 3/1985 |
| DE | 36 33 682 A1 | 10/1986 |
| DE | 37 28 667 A1 | 8/1987 |
| DE | 39 14 834 A1 | 8/1990 |
| DE | 198 10 002 A1 | 3/1998 |
| JP | 57105643 A | 12/1980 |

* cited by examiner

*Primary Examiner*—Derek S Boles

(57) ABSTRACT

A heating device, particularly for a vehicle, includes a burner for producing combustion heat, and also a heat exchanger for transferring combustion heat produced in the burner to a medium to be heated.

13 Claims, 5 Drawing Sheets

HEATING DEVICE, PARTICULARLY FOR A VEHICLE

CROSS-REFERENCE TO RELATED APPLICATIONS

This application is the entry into national stage for PCT/EP03/006507 filed on Jun. 20, 2003, and claiming priority of German Patent Application DE 102 27 626.9 filed on Jun. 20, 2002.

STATEMENT REGARDING FEDERALLY SPONSORED RESEARCH OR DEVELOPMENT

Not applicable.

BACKGROUND OF THE INVENTION

1. Field of the Invention

The present invention relates to a heating device, particularly for a vehicle, including a burner means for producing combustion heat, and also a heat exchanger means for transfer of combustion heat produced in the burner means to a medium to be heated.

2. Description of Related Art

The requirement exists in vehicles, in different system regions and in general also at different periods, to affect operation or functionality by heating a medium. Thus it is known to preheat the interior of the vehicle by the activation of auxiliary heating before the general starting up of a vehicle, for increasing comfort and if necessary deicing of window panes. Furthermore, in particular in connection with modern diesel engine assemblies, it is often required at the beginning of operation to provide additional heat for heating the interior, especially when comparatively low external temperatures prevail. In order to bring internal combustion engines, which are used in vehicles generally as drive assemblies, as quickly as possible into an operating state with low pollutant emission, it is furthermore advantageous at the beginning of operation to preheat, or to support the heating of, this drive assembly by heating a medium generally used for cooling this drive assembly.

BRIEF SUMMARY OF THE INVENTION

The present invention has as its object to provide a compactly designed heating device which fulfills the various heating requirements in a vehicle.

According to the invention, this object is attained by a heating device, particularly for a vehicle, comprising a burner means for the production of combustion heat and also a heat exchanger means for transferring combustion heat produced in the burner means to media to be heated, the heat exchanger means having a first heat exchange region for transfer of combustion heat to a first medium to be heated and a second heat exchange region for the transfer of combustion heat to a second medium to be heated.

In the heating device according to the invention, it is important that a single burner means is provided as heat source and by subdivision of the heat exchanger into two regions, two different media in two different regions can be heated independently of each other. Thus an independent heating device with heat exchanger means and burner region is not to be provided for each medium, which brings with it, besides the clear space saving, also a clearly reduced constructional size and reduced costs.

The heating device according to the invention can for example be used in order to heat a gaseous medium as the first medium to be heated, for example, the air to be introduced into the vehicle interior, and to heat as the second medium to be heated, for example, the cooling liquid circulating through a drive assembly.

In order in the heating device according to the invention to be able to transfer the combustion heat generated in the burner region to the different media, it is proposed that the heat exchanger means has a heat exchange body with a combustion gas conducting space provided therein for receiving combustion heat from combustion gases flowing through the combustion exhaust gas conducting space.

Particularly when the first medium to be heated is gaseous, it is advantageous if the first heat exchanger region has numerous heat transfer ribs providing respective heat exchange surfaces on the heat exchange body.

Since in general the heat exchanger body of the heat exchanger means is produced as a very compact metal component in a casting process, it is proposed for reasons of easier production and of cost that the heat exchange ribs are produced at least partially separately from the heat exchanger body, and are in heat transfer connection with this. It can also be provided here that cooling ribs are formed partially separately and partially or sectionally on the heat exchanger body, as also that cooling ribs are formed completely separately from the heat exchanger body and are installed for example on an external surface thereof.

In the heating device according to the invention, it can furthermore be provided that the second heat exchange region has a flow conducting means for the second medium to be heated. According to a first alternative, this can be realized in that the flow conducting means comprises a medium conducting channel formed in the heat exchanger body. This is an embodiment which is constructionally comparatively simple to produce, since the members to be provided in the region of the heating device and acting to conduct the second medium flow can be substantially completely integrated in the heat exchanger body. In order to be able to provide as efficient heat transfer as possible to the second medium to be heated, it is proposed that the medium conducting channel comprises numerous medium conducting channel regions. In such an embodiment, the transmitted amount of heat can be influenced in a very simple manner, in that at least a portion of the medium conducting channel region can be selectively released for throughflow. A controllable valve can for example be provided for this purpose. Furthermore it is possible to perform the shutting off, or the extent of shutting off, of the different channel regions by means of bimetal closure elements or diaphragm elements which can be more or less closed or opened according to the temperature of the second medium.

In order to be able to very efficiently design the thermal interaction of the second medium to be heated in the region of the heat exchanger with the combustion exhaust gases likewise flowing through it, it is proposed that the medium conducting channel extends in the heat exchanger body approximately parallel to the combustion exhaust gas conducting space.

In a further embodiment, it can be provided that the flow conducting means comprises at least one medium conducting duct in the region of the heat transfer ribs. In this embodiment the second medium to be heated thus takes up heat by means of the heat transfer ribs acting as heat conductors.

In a very space-saving embodiment, it can be provided that at least one medium conducting duct passes through at least a portion of the heat transfer ribs. Here it is particularly advantageous that at least one medium conducting duct passes plural times through at least a portion of the heat transfer ribs.

It should be mentioned that the two abovementioned embodiments, in which the second medium to be heated flows through a channel means formed in the heat exchanger body, or respectively the second medium to be heated flows through a channel means formed in the region of the heat transfer ribs, can be combined so that here, for example, two parallel flow regions are formed, or else these different flow regions are connected in series.

The heating device according to the invention can have a housing means conducting the first medium to be heated, the heat transfer means substantially being arranged in the housing means, and the burner means is arranged substantially outside the housing means. In this manner, firstly a very efficient heat transfer to the first medium to be heated is possible, and secondly the system elements, above all relevant to performing maintenance work, which are mainly located in the region of the burner means, are very well accessible from outside.

According to a further very advantageous aspect of the invention, the heating device can be designed such that none of the heat exchange regions needs the medium to be heated in the other heat exchange region in order to heat the medium to be heated therein. This means that the different heat exchange regions can be effective substantially independently. Their operation or effectiveness can be regulated solely by the extent to which the respective medium to be heated is conducted to the respective heat exchange region. It is a matter of course that the total amount of heat available from the burner means is divided, according to the supply of the different media to be heated, differently to these, and to this extent a greater or lesser heating of one medium has an effect on the heating of the other medium. Likewise the heating device according to the invention is designed such that each of the heat exchange regions can be activated on its own for heating the respective allocated medium, without the other heat exchange region being effective, for example is thereby not effective, in that no medium to be heated is supplied to this.

The present invention furthermore relates to a heating system for a vehicle, including a heating device according to the invention, wherein air as the first medium to be heated and introduced into the vehicle interior is supplied to an air flow region of the first heat exchanger region of the heat exchanger means by means of a first forwarding means, and a conditioning medium of a drive assembly is supplied to a conditioning medium region by means of a second forwarding means as a second medium to be heated.

BRIEF DESCRIPTION OF THE SEVERAL VIEWS OF THE DRAWING(s)

The invention is described in detail hereinafter in different embodiments with reference to the accompanying drawings.

DETAILED DESCRIPTION OF THE INVENTION

Figure 1:
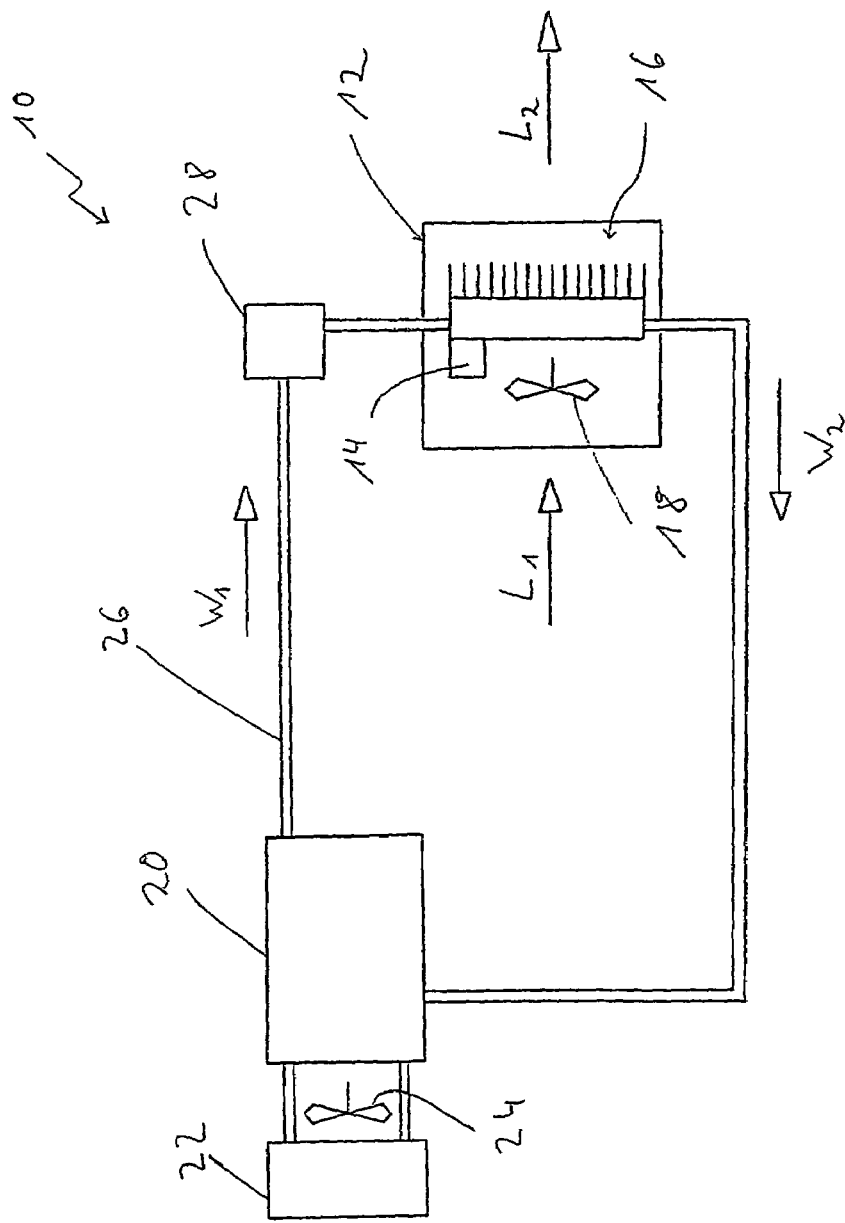
FIG. 1 shows a principle illustration of a heating system including a heating device according to the invention.

In FIG. 1, a heating system which can be inserted into a vehicle is denoted generally by 10. This heating system comprises a heating device 12, described in more detail hereinafter, in which combustion heat is produced by activating a heating burner 14. The combustion heat is transferred in a heat exchanger means 16 to different media to be heated.

Thus for example an air stream $L_1$ is supplied to the heat exchanger means 16 by means of an air fan 18, for example a fan belonging to the vehicle, and the air stream $L_1$ takes up heat on flowing around the heat exchanger means 16, and the heating device 12 delivers it as a heated air stream $L_2$ in the direction of a vehicle interior. The amount of the heated air to be fed into the vehicle interior can be adjusted according to how strongly the fan 18 is operated or to what extent corresponding air throttle flaps are opened or closed.

A drive assembly 20, for example constituted as an internal combustion engine, is furthermore seen in FIG. 1. To this there is allocated a cooler 22 with a cooler fan 24. Cooling liquid circulates between the drive assembly 20 and the cooler 22, in order to prevent overheating of the drive assembly 20. In a further coolant circuit 26, a coolant stream $W_1$ is conducted by means of a pump 28 to the heating device 12. The coolant conducted by means of the pump 28 to the heating device 12 flows through the heat exchanger means 16 and leaves the heating device 12 as a thermally treated coolant stream $W_2$. This is further conducted to the drive assembly 20. The coolant flow or the amount of heat transferred can be adjusted according as to the extent that the pump 28 is operated, or corresponding as the circuit 26 valves to be opened or closed are arranged.

It is possible to operate the heating system 10 according to the invention in various operating modes by means of the structure described above. Thus in an auxiliary heating operation, only the fan 18 is activated, so that substantially all of the combustion heat produced in the heating burner 14 can be transferred in the heat exchanger means to the air to be conducted into the vehicle interior. In this manner a very rapid and efficient heating of the vehicle interior is made possible. In this phase, the circuit 26 is not active, which means that no heat is transferred to the coolant of the drive assembly 20.

In a second operating mode, the heating device 12 can be operated in order to preheat the drive assembly 20 or for accelerated heating of this in the starting phase. In this phase, only the pump 28 is operated, and the fan 18 is deactivated. The combustion heat produced in the heating burner 14 is then substantially transferred in the heat exchanger means 16 to the coolant flowing in the circuit 26, so that a very rapid heating of the drive assembly 20 can be achieved.

In a third operating mode, in the starting phase or the drive assembly, with a deactivated circuit 26, i.e., deactivated pump 28, the fan 18 can again be activated for accelerated heating of the vehicle interior, so that the combustion heat is transferred substantially completely to the air to be heated. This operating mode substantially corresponds to the auxiliary heating mode, but with the drive assembly 20 simultaneously operated or started.

In a travel operating mode, accordingly a state in which the drive assembly 20 is comparatively hot and thus by energizing the pump 28 very hot coolant can be conducted as the stream $W_1$ into the circuit 26, this coolant can transfer heat in the heat exchanger means 16 to the air also conducted into the heating device 12 by energizing the fan 18. That is, the air to be fed into the vehicle interior is heated by heat energy provided in the drive assembly 20, transferred by means of the liquid coolant and the heat exchanger means 16. The heating burner 14 does not have to be activated in this phase.

In a mixed operating mode, for example with a stationary vehicle and with a simultaneously running drive assembly 20 and activated heating burner 14 in the heating device 12, heat can both be transferred to the air to be introduced into the vehicle interior, and also heat can be transferred to the coolant circulating in the circuit 26. This is particularly advantageous in low external temperatures, since in this state, also for example with the drive assembly 20 idling, this can be kept to a suitable operating temperature.

It should be generally stated as regards the heating system 10 that of course the various system components acting as forwarding means, i.e., the fan 18 and the pump 28, do not necessarily have to be arranged upstream of the heat exchanger means 16. Both the pump 28 and also the fan 18 can produce by suction the respective circulating or forwarding action for the different media to be conducted into the heat exchanger means 16.

Figure 2:
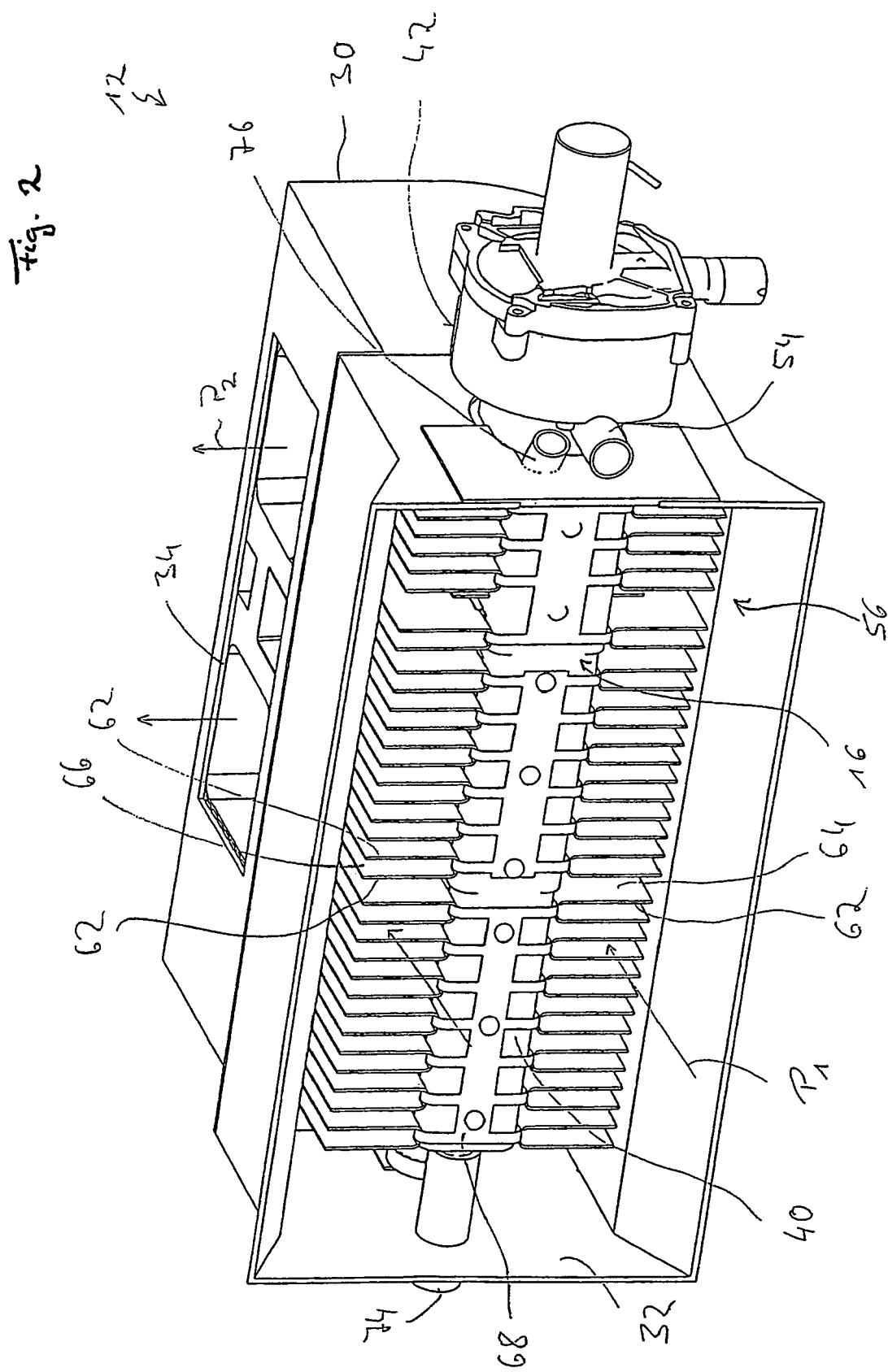
FIG. 2 shows a perspective view of a heating device according to the invention in the built-in state.
Figure 3:
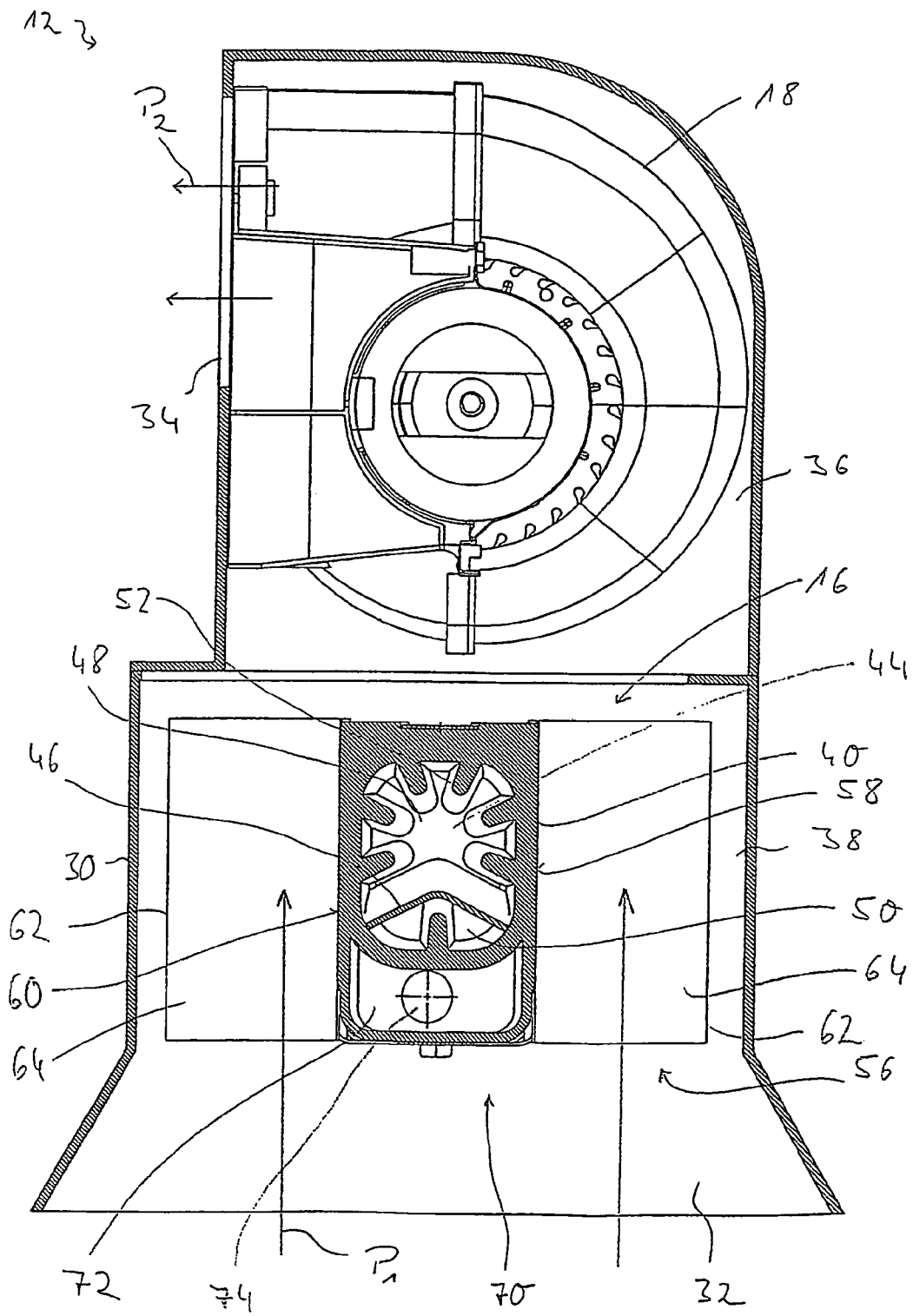
FIG. 3 shows a sectional view of the heating device shown in FIG. 2.

The constructional structure of the heating device 12 shown only schematically in FIG. 1 is described in detail hereinafter with reference to FIGS. 2-5. FIGS. 2 and 3 on the one hand, and FIGS. 4 and 5 on the other hand, show respective different embodiments of such a heating device 12.

In the heating device 12 shown in FIGS. 2 and 3, a for example one-part housing 30 can first be seen, for example a ventilation housing belonging to the vehicle, into which the heat exchanger means 16 is integrated. The housing means 30 has an inlet aperture 32 for the air to be heated, i.e., the air stream L1 in FIG. 1, through which aperture 32 the air flow L1 flows into the heating device 12 as shown by the arrow $P_1$. The fan 18, likewise shown schematically in FIG. 1, is provided downstream of the heat exchanger means 16 so that the air enters the housing 30 by the suction of this fan 18. The air leaves the housing 30, as shown by the arrow $P_2$, in the region of an outlet aperture means 34. It can be seen, above all in FIG. 3, that the housing 30 is substantially divided into two regions 36, 38. While the heat exchanger means 16 is substantially positioned in the region 38, the already mentioned fan 18 and if necessary also an air conditioning device are provided in the region 36.

The heat exchanger means 16 includes a heat exchanger body 40, e.g. produced from metal in a casting process, extending transversely of the flow direction $P_1$ substantially over the whole length of the aperture 32 of the housing 30 and supported at its two longitudinal end regions by the housing 30. A burner means generally denoted by 42 is provided at the end region, which can be seen on the right of FIG. 2, of the heat exchanger body 40. This comprises, as generally known, a combustion chamber, adjoining which a flame tube leading into the heat exchanger body 40 can be provided, a fuel supply, a combustion air fan, and the like. The essential components of this burner means are provided outside the housing 30, so that easy access is possible to the burner means 42, for example for maintenance or repair work.

The elongate heat exchanger body 40 has a combustion exhaust gas flow space 44 which extends substantially along the whole length of, and in, the heat exchange body 40. This space 44 is divided into two spatial regions 48, 50 by a partition element 46. The combustion exhaust gases leaving the burner means 42 flow into the spatial region 48, formed at its internal surface with rib means 52, and flow along this spatial region to the end of the heat exchanger body 40, shown at the right of FIG. 2. The combustion gases are deflected there, arriving in the spatial region 50, in which they flow back again toward the burner means 42. The combustion gases then leave this spatial region 50 via an outlet stub 54, located outside the housing 30. Thus there is no danger that combustion gases exit the heat exchange body 40 due to a defect or leakage and reach the air stream to be introduced into the vehicle interior.

On flowing through the heat exchanger body 40, the combustion exhaust gases transfer heat to the heat exchanger body 40, which heat is then, as described hereinafter, given up via two heat exchanger regions to the air flowing through the housing 30, on the one hand, and to the liquid coolant circulating in the circuit 26 of FIG. 1, on the other hand.

The first heat exchange region 56 includes, besides the heat exchanger body 40, which of course also forms one region of this first heat exchanger region 56, respectively numerous heat transfer ribs 62 in succession longitudinally of the heat exchanger body 40, at two opposing side regions 58, 60 of the heat exchanger body 40. These heat exchanger ribs 62 provide respective heat transfer surfaces 64, which extend substantially in the flow direction $P_1$ of the air stream passing through the housing 30. Thus this first heat exchanger region 56 provides a comparatively large total surface for heat transfer, the flow resistance for the air flowing through the housing 30 being kept small. As regards the constructional design of the heat exchange ribs 62, it should be stated that respective heat transfer rib elements 66 can be provided and include every two adjacent heat transfer ribs 62. These heat transfer rib elements 66 can be obtained by bending sheet metal blanks into a U-shape. By clamp elements 68 provided on both sides of the heat exchanger body, and for example made of sheet metal material, the heat transfer rib elements 66 are held in regions of the heat exchanger body 40 provided for this and formed corresponding to the shaping of the these elements 66, so that a good heat transfer contact exists between these heat transfer elements 66 and thus the heat transfer ribs 62 and the heat exchanger body 40. formed separately from the heat exchanger body 40.

The design of the first heat exchanger region 56 with heat transfer ribs formed separately from the heat exchanger body 40 simplifies the production of the heat exchanger means 16, particularly its heat exchanger body 40 produced by a casting process.

In a second heat exchanger region 70 formed substantially in the heat exchanger body 40, the liquid coolant is heated or, as also previously described, this coolant transfers heat to the heat exchanger body 40, with corresponding preheating by the drive assembly 20. To this extent the heat exchanger body 40 also thus forms a component of the second heat exchanger region 70.

It can be seen in FIG. 3 that a flow channel 72 is provided in the heat exchanger body 40, extending approximately parallel to the combustion exhaust gas conducting space 44. The liquid to be heated can enter this channel 72 in the region of the inlet stub 74. The liquid can then leave this channel 72 in the region of an outlet stub 76. It should be mentioned that the flow direction can of course run in the opposite direction. In order to design the heat transfer in the second heat exchanger region 70 very efficiently, it is possible to provide vortex elements, for example a liquid-guiding spiral, in the channel 72, order to ensure good mixing of the liquid flowing through this channel 72. It is also possible to build up the channel 72 from plural adjacently running channel regions so that with approximately constant total flow cross section, the surface at which the liquid medium to be heated can come into contact with the heat exchange body 40 can be clearly increased. With this embodiment it is furthermore possible to allocate members to at least a few of these channel elements which can selectively close them, in order to be able to regulate the total cross section. Here controllable valves can for example be used. It is also possible use diaphragms which are effective like bimetals and which shut off according to temperature the channel regions through which liquid flows through the second heat exchange region 70 (at comparatively high temperature) or open channel regions (at comparatively low temperature).

It can be seen from the foregoing description that a heating device is provided by means of the present invention which is capable of heating two different media substantially independently of one another, and this with a very compact constructional size. It is important for this that a single burner arrangement 42 is allocated to a heat exchanger means 16 with two mutually independently effective heat exchanger regions 56, 70. For the operation of the heating device according to the invention it is elementary that each of the heat exchanger regions 70, 56 can be effective on its own, independently of whether or not medium to be heated flows in the other heat exchanger region 56, 70. The effectiveness of each of the heat exchange regions 56, 70, that is, the amount of the heat energy transferred therein to a medium, can likewise be independently set, for example by the continuously variable controllability of the respective medium stream. Besides the gain in space due to the compact mode of construction, the construction according to the invention leads to a marked cost saving, for example in the region of tubing or cables and above all by the omission of an additional heat exchanger or an additional burner means. The whole set of sensors can also be much more simply designed.

Figure 4:
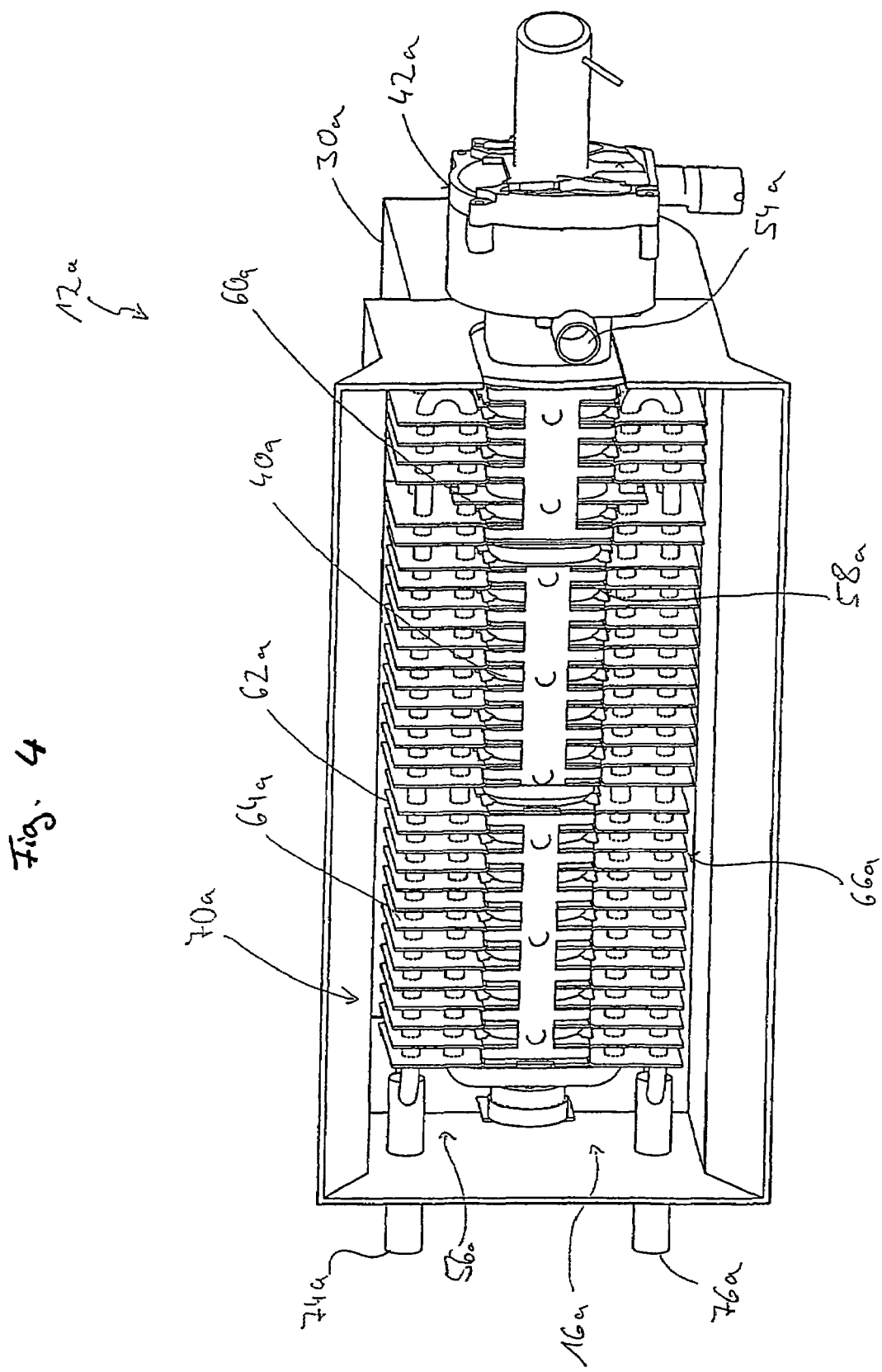
FIG. 4 shows a further perspective diagram of a heating device
according to the invention according to an alternative embodiment, in the built-in state.
Figure 5:
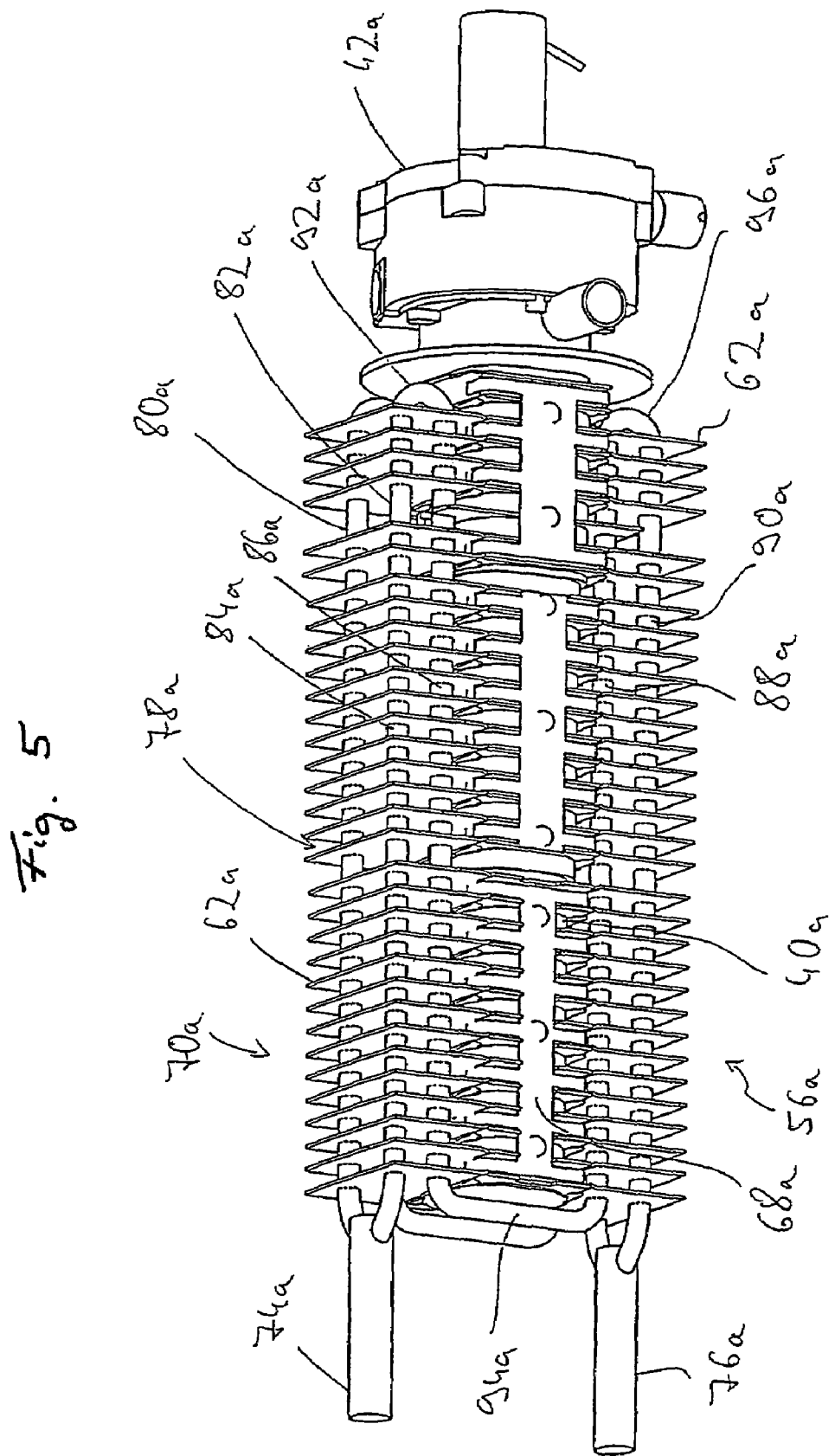
FIG. 5 shows the heating device shown in FIG. 4, with the housing omitted.

FIGS. 4 and 5 show an alternative embodiment of the heating device according to the invention. Components which correspond in construction or function to those previously described are denoted by the same reference numerals with an added "a". It should be mentioned that in essential system regions the heat exchanger means 16a or the whole heating device 12a correspond to the structure described with reference to FIGS. 2 and 3. Reference is therefore made to the related descriptions. This applies above all to the structure of the heat exchanger region 56a with the heat exchange body 40a and the heat transfer rib elements 66a with heat transfer rib pairs 62a provided on its outside.

Differing from the embodiment of FIGS. 2 and 3, the alternative shown in FIGS. 4 and 5 of the heat exchanger body 40a has in its interior no channel region or spatial region for the second heat exchanger region 70a. Rather, it can be seen above all in FIG. 5 that the second heat exchanger region 70a comprises, between an inlet stub 74a and an outlet stub 76a (here also the flow direction can of course be reversed) a duct system 78a with mutually parallel duct trains 80a, 82a respectively connecting to the stubs 74a or 76a, These duct trains 80a, 82a, which are substantially of like construction, include at each side 58a, 60a of the heat exchanger body 40a, on which the heat transfer rib elements 66a are arranged, respectively two duct sections 84a, 86a, 88a, 90a running approximately mutually parallel and passing approximately orthogonally through the heat transfer ribs 62a provided on these sides 58a or 60a respectively. The duct section 84a connects to the inlet stub 74a and in its end region near the burner means 42a merges, through a curved connecting section 92a, into the duct section 86a. At its end region remote from the burner means 42a, this is in connection with the duct section 88a, by means of a bridging section 94a bridging over the heat exchanger body 40a, and at its other end merges into the duct section 90a via a curved connecting section 96a. This duct section 90a is in its turn connected in its end region remote from the burner means 42a to the outlet stub 76a. The same also of course holds for the duct train 80a.

The heat received in the heat exchanger body 40a from the combustion exhaust gases is thus conducted via the heat transfer ribs 62a into the region of the duct system 78a or the duct train 80a, 82a of the same. The duct sections 84a, 96a, 88a, 90a, generally made of metal, receive heat in their regions in contact with the heat exchanger ribs 62a and then transfer it to the medium flowing through these, Since the portions of the different duct sections 84a, 86a, 88a, 90a located between the heat transfer ribs 62a are of course also heated, these simultaneously also enlarge the total surface of the first heat exchanger region 56a, since the air flowing into the housing 30a of course also flows around these portions of the duct sections 84a, 86a, 88a, 90a.

It should be mentioned that the paths of the different duct trains of the duct system 78a can of course be chosen differently than those described in the foregoing. Furthermore it is not essential to provide a symmetrical arrangement on both sides of the heat exchanger body 40a. Whether the different duct sections are fixedly connected to the heat transfer ribs 62a through which they pass, for example by soldering, depends on the required stability, but however is preferred for reasons of better thermal coupling.

The same advantages as with the previously described embodiment result in operation with the alternative embodiment shown in FIGS. 4 and 5. Here also each of the heat exchanger regions 70a, 56a can be operated substantially independently of the other heat exchanger region, in that control is affected of the supply of the respective medium to be heated or thermally treated. It is also of course possible with this embodiment to transfer heat directly between the heat exchanger regions 56a, 70a, namely in that heated medium flowing in the duct system 78a heats the heat exchange ribs 62a, which then in their turn heat the air flowing around these.

Finally it should be mentioned that the two embodiments described above can of course be combined, and that flow channels for the medium flowing through the second heat exchanger region can also be provided in the region of the heat transfer ribs. It is further to be stated that the medium to be heated as described above with reference to the embodiments of FIGS. 2-5 was mentioned only for example as liquid, thus for example cooling liquid, and air. It is of course possible to heat other media in these regions.

What is claimed is:

1. A heating device for a vehicle, comprising:
a burner means for producing combustion heat,
a heat exchanger means for transferring combustion heat produced in the burner means to medium to be heated,
wherein the heat exchanger means has a first heat exchanger region for transferring combustion heat to a gaseous first medium to be heated and a second heat exchange region for transferring combustion heat to a liquid second medium to be heated,
wherein the heat exchanger means has a heat exchanger body with a combustion exhaust gas conducting space provided therein and surrounded by the heat exchanger body for receiving combustion heat from the combustion exhaust gases flowing through the combustion exhaust gas conducting space,
wherein furthermore
the first heat exchanger region has numerous heat transfer ribs provided on the outside of the heat exchanger body and respectively providing heat transfer surfaces, and the second heat exchanger region has a flow duct means for the second medium to be heated,
the flow duct means includes at least one medium conducting duct running in the region of the heat transfer ribs,
and wherein
the at least one medium conducting duct passes at least partially through at least a portion of the heat transfer ribs.

2. The heating device according to claim 1, wherein the heat transfer ribs are at least partially formed separately from the heat exchange body and are in heat transfer connection with the heat exchange body.

3. The heating device according to claim 1, wherein the flow duct means includes a medium conducting channel formed in the heat exchange body.

4. The heating device according to claim 3, wherein the medium conducting channel includes numerous medium conducting channel regions.

5. The heating device according to claim 4, wherein at least a portion of the medium conducting channel regions is selectively releasable for through flow.

6. The heating device according to claim 3, wherein the medium conducting channel extends in the heat exchange body approximately parallel to the combustion exhaust gas conducting space.

7. The heating device according to claim 1, wherein at least one medium conducting duct passes plural times through at least a portion of the heat transfer ribs.

8. The heating device according to claim 1, wherein it has a housing means conducting the first medium to be heated, the heat exchanger means being substantially arranged in the housing means and the burner means being substantially arranged outside the housing means.

9. The heating device according to claim 1, wherein none of the heat exchanger regions requires, for heating the medium to be heated therein, the medium to be heated in the other heat exchange region.

10. The heating device for a vehicle, including a heating device according to claim 1, wherein an air flow region supplies air to be heated and introduced into a vehicle interior to the first heat exchanger region of the heat exchanger means by means of a first forwarding means as the first medium to be heated and a conditioning medium flow region supplies conditioning means of a drive assembly to the second heat exchange region by means of a second forwarding means as the second medium to be heated.

11. The heating device according to claim 2, wherein the flow duct means includes a medium conducting channel formed in the heat exchange body.

12. The heating device according to claim 4, wherein the medium conducting channel extends in the heat exchange body approximately parallel to the combustion exhaust gas conducting space.

13. The heating device according to claim 5, wherein the medium conducting channel extends in the heat exchange body approximately parallel to the combustion exhaust gas conducting space.

* * * * *